(12) United States Patent
Hirano

(10) Patent No.: US 12,735,135 B2
(45) Date of Patent: Sep. 15, 2026

(54) STRADDLED VEHICLE

(71) Applicant: YAMAHA HATSUDOKI KABUSHIKI KAISHA, Iwata (JP)

(72) Inventor: Akinori Hirano, Shizuoka (JP)

(73) Assignee: NITTOKU CO., LTD., Saitama-City (JP)

( * ) Notice: Subject to any disclaimer, the term of this patent is extended or adjusted under 35 U.S.C. 154(b) by 845 days.

(21) Appl. No.: 17/697,817

(22) Filed: Mar. 17, 2022

(65) Prior Publication Data

US 2022/0297783 A1 Sep. 22, 2022

(30) Foreign Application Priority Data

Mar. 18, 2021 (JP) ................................ 2021-044897

(51) Int. Cl.

| | |
|---|---|
| ***B62J 45/41*** | (2020.01) |
| ***B62J 1/08*** | (2006.01) |
| ***B62J 6/04*** | (2020.01) |
| ***B62J 23/00*** | (2006.01) |
| ***B62J 45/42*** | (2020.01) |

(52) U.S. Cl.

CPC ................ *B62J 45/41* (2020.02); *B62J 1/08* (2013.01); *B62J 6/04* (2013.01); *B62J 23/00* (2013.01); *B62J 45/42* (2020.02)

(58) Field of Classification Search

CPC ..... B62J 45/11; B62J 45/42; B62J 1/08; B62J 6/04; B62J 23/00

See application file for complete search history.

(56) References Cited

U.S. PATENT DOCUMENTS

| | | | | |
|---|---|---|---|---|
| 9,902,313 | B2 * | 2/2018 | Taguma | B60Q 1/0005 |
| 9,975,586 | B2 * | 5/2018 | Shigihara | B62D 37/02 |
| 10,173,742 | B2 * | 1/2019 | Mizuta | B62J 6/04 |
| 2012/0320612 | A1 * | 12/2012 | Yamakura | B62J 6/055 280/281.1 |
| 2014/0291958 | A1 * | 10/2014 | Tanaka | B62H 5/006 280/202 |
| 2017/0101147 | A1 * | 4/2017 | Hasegawa | B62J 50/25 |
| 2017/0355300 | A1 | 12/2017 | Kurata | |

(Continued)

FOREIGN PATENT DOCUMENTS

| | | |
|---|---|---|
| EP | 3453600 A1 | 3/2019 |
| JP | 2017091138 A | 5/2017 |

(Continued)

*Primary Examiner* — Valentin Neacsu
*Assistant Examiner* — Michael R Stabley
(74) *Attorney, Agent, or Firm* — Rabin & Berdo, P.C.

(57) ABSTRACT

A straddled vehicle including a seat frame extending rearward and upward, a seat supported by the seat frame, a rear fender extending rearward and downward, the rear fender having a front end located further forward than a rear end of the seat frame, a tail light having a rear end thereof located further rearward than a rear end of the seat, and a radar including a transmitter that transmits radio waves, a receiver that receives the radio waves, and a casing that houses the transmitter and the receiver. The radar is supported by the seat frame. At least a portion of the radar is arranged further forward than a rear end of the tail light, further downward than an upper end of the seat frame, further rearward than the front end of the rear fender, and further upward than a lower end of the rear fender.

14 Claims, 10 Drawing Sheets

(56) References Cited

U.S. PATENT DOCUMENTS

| | | | | |
|---|---|---|---|---|
| 2021/0001945 | A1 * | 1/2021 | Hagimoto | B62J 45/40 |
| 2021/0061391 | A1 | 3/2021 | Yamashita et al. | |
| 2022/0055706 | A1 * | 2/2022 | Saeki | B62J 45/41 |

FOREIGN PATENT DOCUMENTS

| | | | |
|---|---|---|---|
| JP | 2017218133 | A | 12/2017 |
| WO | 2020129789 | A1 | 6/2020 |

* cited by examiner

U
D
F
Re
1
2
3
4
5
7
8
9
10
11
12
14
15
16
20
II

U
F
Re
D
16
LA
10b
10t
14f
9b
10
11
18
9
LB14
LB
14b
14
LA14
14d
21
23
20
22
T20
15
12f
12t
20f
3
20b
12
12d

U
F
Re
D
6
10
20f
10t
14f
14t
14b
9
14
10b
20b
20(23)
11
15
12f
24L
12
12d

U
L
R
D
CL
20
14
14R
14L
15
12
3

STRADDLED VEHICLE

CROSS REFERENCE TO RELATED APPLICATIONS

This application claims the benefit of priority to Japanese Patent Application No. 2021-044897 filed on Mar. 18, 2021. The entire contents of this application are incorporated herein by reference.

BACKGROUND OF THE INVENTION

Field of the Invention

The present invention relates to a straddled vehicle having a radar on a rear portion of the vehicle body.

Description of the Related Art

Straddled vehicles having a radar on a rear portion of the vehicle body have been known in the art. Such straddled vehicles, with the radar, can detect other vehicles coming close from behind. The radar includes a transmitter that transmits radio waves, a receiver that receives radio waves (reflected waves) that have been reflected off objects such as other vehicles, an antenna, and a casing that houses these components.

The higher the performance of a radar, the larger the volume of the casing and the weight of the radar tend to be. However, a tail light and a rear fender are arranged on a rear portion of a straddled vehicle, and the space for installment of a radar is limited. Moreover, a radar needs to be arranged so as not to block emitted light from the tail light. It is not easy to arrange a large casing on a rear portion of a straddled vehicle.

In view of this, the transmitter and the receiver of a radar may be housed in separate casings, thereby reducing the volume per casing. However, if the transmitter and the receiver are housed in separate casings, it will be more difficult to route wires that connect them together.

FIG. 2 of JP 2017-218133A describes a motorcycle that includes, not a radar, but a detector that detects millimeter waves, etc., emitted from other vehicles. The detector is housed in a casing, and is provided on a rear portion of the vehicle body. The casing is attached to a rear fender downward of the tail light so as not to block emitted light from the tail light. JP 2017-218133A also describes attaching the casing to a seat cowl.

SUMMARY OF THE INVENTION

Technical Problem

A straddled vehicle vibrates when, for example, running on an uneven road surface. Normally, a rear fender is made light in weight in order to reduce the weight of the vehicle body. The rigidity of a rear fender is relatively low. Therefore, if a large and heavy radar is attached to a rear fender, the radar is likely to be influenced by vibration as the rear fender bends due to vibration while running. In view of this, the rigidity of the rear fender may be increased so that the radar is less likely to be influenced by vibration. However, an attempt to increase the rigidity of the rear fender will increase the size and the weight of the rear fender.

The radar may be arranged upward of the tail light by being attached to the seat cowl. By arranging the radar upward of the tail light, it is possible to prevent the radar from blocking emitted light from the tail light. However, as is the rear fender, the seat cowl is a member whose rigidity is relatively low. Also when the radar is attached to the seat cowl, similar problems to those described above will occur. If a large radar is arranged upward of the tail light, the passenger's comfort may lower. Some straddled vehicle users prefer to attach a luggage box as an optional accessory upward of the tail light. However, such a luggage box cannot be attached if a large radar is arranged upward of the tail light.

It is an object of the present invention to provide a straddled vehicle in which a radar provided on a rear portion of the vehicle body does not block emitted light from the tail light and is less likely to be influenced by vibration.

Solution to Problem

A straddled vehicle disclosed herein includes: a seat frame extending rearward and upward; a seat supported on the seat frame; a rear fender extending rearward and downward, the rear fender having a front end located forward relative to a rear end of the seat frame; a tail light having a rear end located rearward relative to a rear end of the seat; and a radar. The radar includes a transmitter that transmits radio waves, a receiver that receives radio waves, and a casing that houses the transmitter and the receiver. The radar is supported on the seat frame. At least a portion of the radar is arranged forward relative to a rear end of the tail light, downward relative to an upper end of the seat frame, rearward relative to a front end of the rear fender and upward relative to a lower end of the rear fender.

With the straddled vehicle described above, at least a portion of the radar is arranged forward relative to the rear end of the tail light, downward relative to the upper end of the seat frame, rearward relative to the front end of the rear fender and upward relative to the lower end of the rear fender. Therefore, even a relatively large radar can be arranged in a rear portion of the vehicle body without difficulty. The radar is less likely to block emitted light from the tail light. With the straddled vehicle described above, the radar is supported on the seat frame. As compared with a case where the radar is supported on the rear fender or the seat cowl, the radar is less likely to be influenced by vibration. Therefore, it is possible to provide a straddled vehicle in which a radar does not block emitted light from the tail light and is less likely to be influenced by vibration.

The straddled vehicle may include a seat cowl arranged sideward of the seat frame. It is preferred that the radar is not supported either one of the rear fender and the seat cowl.

According to a preferred embodiment, the seat frame includes a left seat frame and a right seat frame arranged rightward of the left seat frame. The straddled vehicle includes: a base member fixed to the left seat frame and the right seat frame; and a support member fixed to the base member. The radar is supported on the support member.

According to the embodiment described above, it is possible to stably support the radar. Thus, it is possible to suppress vibration of the radar.

According to a preferred embodiment, the seat frame includes a left seat frame and a right seat frame arranged rightward of the left seat frame. The straddled vehicle includes a support member fixed to the left seat frame and the right seat frame. The radar is supported on the support member.

According to the embodiment described above, it is possible to stably support the radar. Thus, it is possible to suppress vibration of the radar.

According to a preferred embodiment, the support member extends rearward and downward.

According to the embodiment described above, the support member and the radar can be arranged in a compact arrangement.

According to a preferred embodiment, the straddled vehicle includes a rubber-made member interposed between the seat frame and the radar.

According to the embodiment described above, vibration of the seat frame is less likely to be transmitted to the radar, and it is therefore possible to suppress vibration of the radar.

According to a preferred embodiment, the tail light is arranged upward relative to an upper end of the rear fender. The radar is arranged downward relative to a lower end of the tail light.

According to the embodiment described above, the radar is arranged in a compact arrangement without blocking emitted light from the tail light.

According to a preferred embodiment, as the vehicle is viewed from the side, a direction of extension of a rear end portion of the seat frame is defined as a first direction and a direction perpendicular to the first direction is defined as a second direction, wherein a dimension of the tail light in the second direction is smaller than a dimension of the tail light in the first direction.

According to the embodiment described above, the tail light is a thin-type tail light. The radar is arranged in a compact arrangement without blocking emitted light from the tail light.

According to a preferred embodiment, the tail light is attached to the rear fender. The radar is arranged upward relative to an upper end of the tail light.

According to the embodiment described above, the radar is arranged in a compact arrangement without blocking emitted light from the tail light.

A front end of the radar may be located forward relative to a rear end of the seat frame.

A rear end of the radar may be located rearward relative to a rear end of the seat frame.

A front end of the radar may be located forward relative to a front end of the tail light.

A rear end of the radar may be located forward relative to a rear end of the tail light.

A dimension of the casing in a front-rear direction may be smaller than a dimension the casing in an up-down direction.

Advantageous Effects of Invention

According to the present invention, it is possible to provide a straddled vehicle in which a radar provided on a rear portion of the vehicle body does not block emitted light from the tail light and is less likely to be influenced by vibration.

DETAILED DESCRIPTION OF THE PREFERRED EMBODIMENTS

First Embodiment

Figure 1:
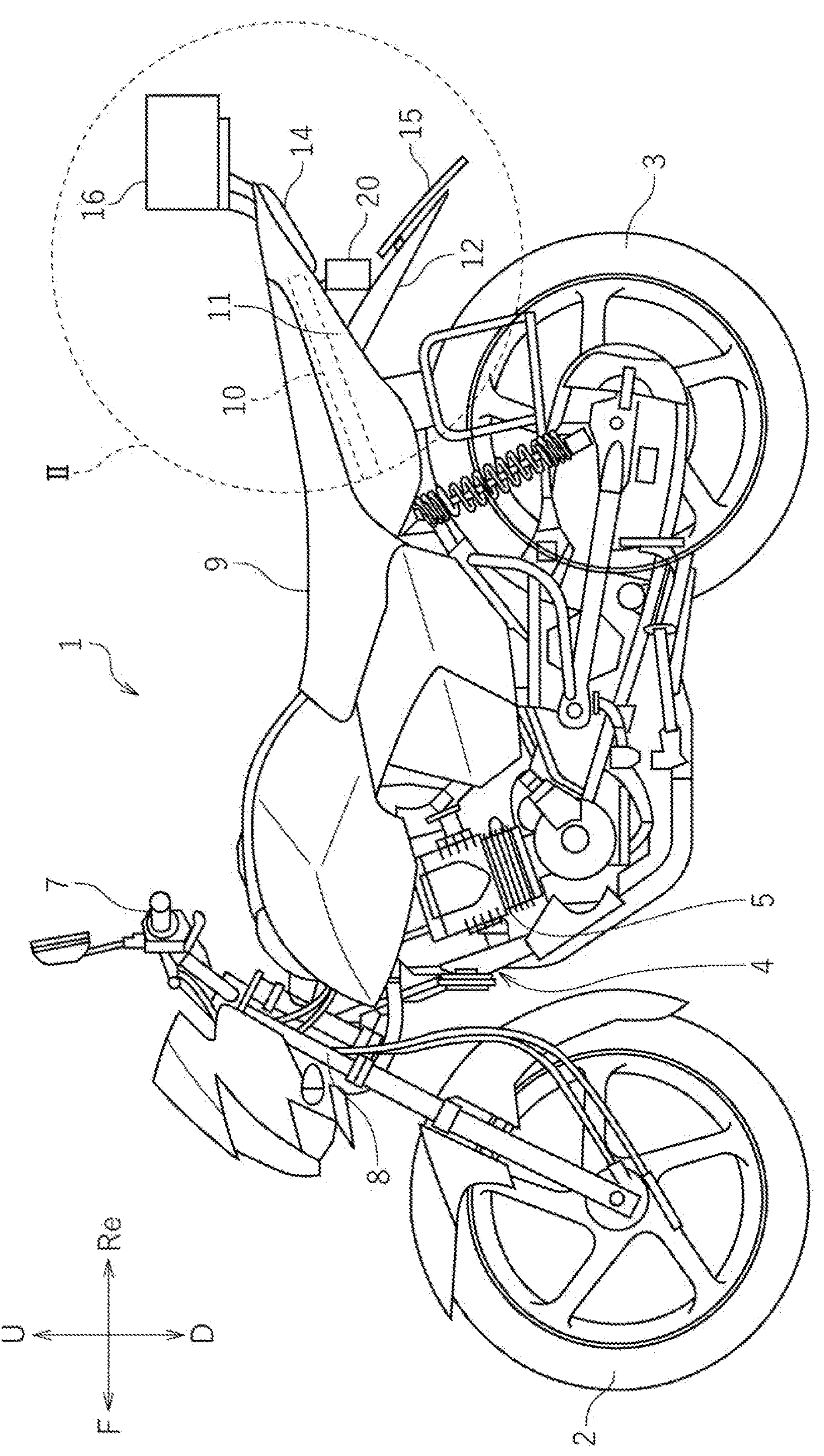
FIG. 1 is a left side view showing a motorcycle according to a first embodiment.

Embodiments of the present invention will now be described with reference to the drawings. FIG. 1 is a side view showing a motorcycle 1 according to one embodiment. The motorcycle 1 includes a front wheel 2, a rear wheel 3, a vehicle body 4 supported on the front wheel 2 and the rear wheel 3, and an internal combustion engine (hereinafter referred to as an engine) 5 supported on the vehicle body 4. The vehicle body 4 includes a steering shaft 8 to which a handle 7 is attached, and a seat 9 on which the rider is seated.

The terms front, rear, left, right, up and down, as used in the description below, refer to these directions as seen from a virtual passenger (not shown) seated on the seat 9 while the motorcycle 1 is standing upright on a horizontal surface with no passenger and no load thereon, unless specified otherwise. The designations F, Re, L, R, U and D, as used in the figures, refer to front, rear, left, right, up and down, respectively.

Figure 2:
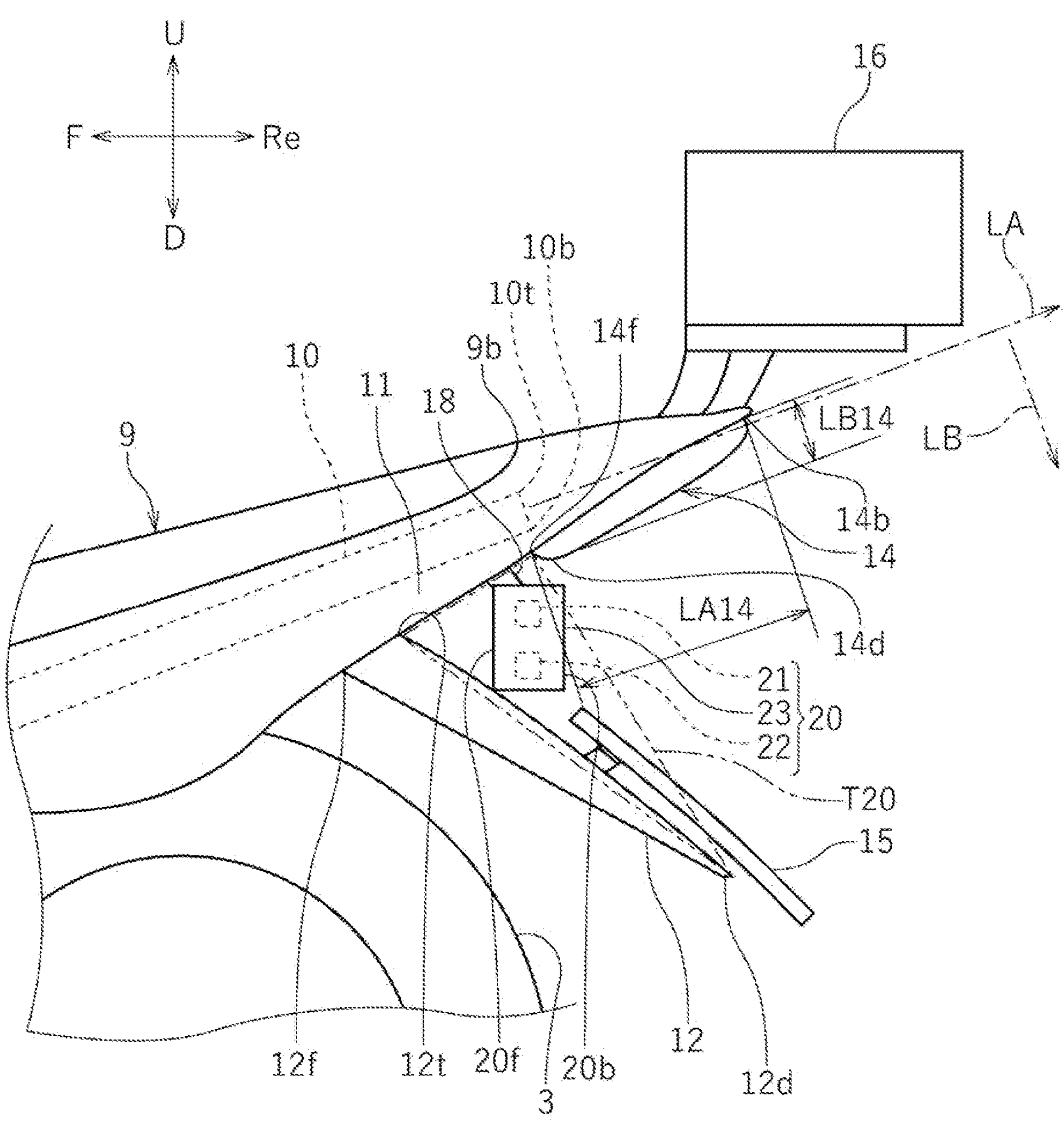
FIG. 2 is an enlarged view showing section II of FIG. 1.

FIG. 2 shows section II of FIG. 1 on an enlarged scale, and is an enlarged side view showing a rear portion of the motorcycle 1. As shown in FIG. 2, the motorcycle 1 includes a left seat frame 10, a seat cowl 11, a tail light 14, a rear fender 12, a license plate 15 and a radar 20.

The seat frame 10 extends rearward and upward. The seat 9 is supported on the seat frame 10. The seat cowl 11 is arranged sideward of the seat frame 10. The rear fender 12 extends rearward and downward. The seat frame 10 is made of a metal, and the seat cowl 11 and the rear fender 12 are made of a synthetic resin. Note however that there is no particular limitation on the materials of the seat frame 10, the seat cowl 11 and the rear fender 12. A front end 12*f* of the rear fender 12 is located forward relative to a rear end 10*b* of the seat frame 10. A rear end 14*b* of the tail light 14 is located rearward relative to a rear end 9*b* of the seat 9.

The tail light 14 is arranged upward relative to an upper end 12*t* of the rear fender 12. In the present embodiment, the tail light 14 is formed as a thin-type tail light. As shown in FIG. 2, as the vehicle is viewed from the side, the direction of extension of the rear end portion of the seat frame 10 is defined as the first direction LA and the direction perpendicular to the first direction LA is defined as the second direction LB. The dimension LB14 of the tail light 14 in the second direction LB is smaller than the dimension LA14 thereof in the first direction LA. LB14<LA14.

The radar 20 includes a transmitter 21 that transmits radio waves, a receiver 22 that receives radio waves, and a casing 23 that houses the transmitter 21 and the receiver 22. The radar 20 is a sensor for blind spot detection (rear blind spot detection function). The radar 20 transmits radio waves and receives radio waves that have been reflected off objects such as other vehicles to detect the presence of objects such as other vehicles rearward of the motorcycle 1. Here, the transmitter 21 is configured to transmit millimeter waves with high directivity.

The casing 23 is formed in a rectangular shape. The dimension of the casing 23 in the front-rear direction is smaller than the dimension of the casing 23 in the up-down direction. The dimension of the casing 23 in the front-rear direction is smaller than the dimension of the casing 23 in the left-right direction. Note however that the shape of the casing 23 disclosed herein is merely an example. There is no particular limitation on the shape of the casing 23.

The radar 20 is supported on the seat frame 10. Here, the radar 20 is supported so as to be suspended from the seat frame 10. The seat frame 10 is configured to support the load of the radar 20. The radar 20 is not supported by either the rear fender 12 or the seat cowl 11. The rear fender 12 and the seat cowl 11 do not support the load of the radar 20. The radar 20 is attached to a support member 18 fixed to the seat frame 10, for example. Here, the support member 18 extends rearward and downward from the seat frame 10. Note however that there is no particular limitation on the structure for supporting the radar 20 on the seat frame 10 (hereinafter referred to as the radar support structure). The radar support structure may be a structure as described below, for example.

Figure 3:
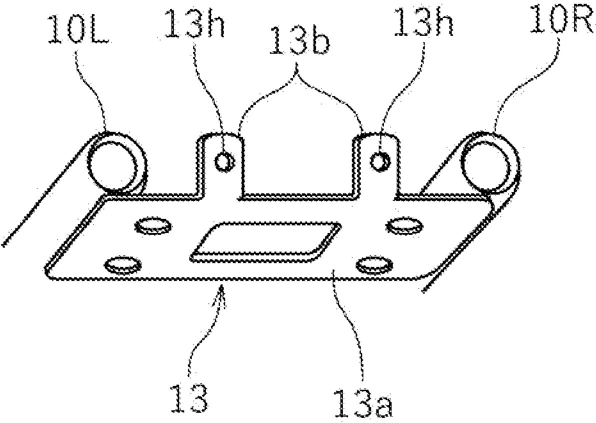
FIG. 3 is a perspective view showing a portion of an example of a radar support structure.

In an example of the radar support structure, as shown in FIG. 3, the seat frame 10 includes a left seat frame 10L, and a right seat frame 10R arranged rightward of the left seat frame 10L. A base member 13 is fixed to the left seat frame 10L and the right seat frame 10R. The base member 13 is provided so as to bridge from the left seat frame 10L to the right seat frame 10R. Note that the left seat frame 10L, the right seat frame 10R and the base member 13 are all made of a metal. The base member 13 includes a horizontal plate portion 13*a*, and a plurality of fold-back portions 13*b* extending upward from the rear end of the horizontal plate portion 13*a*. Holes 13*h* that are open in the front-rear direction are formed in the fold-back portions 13*b*.

Figure 4:
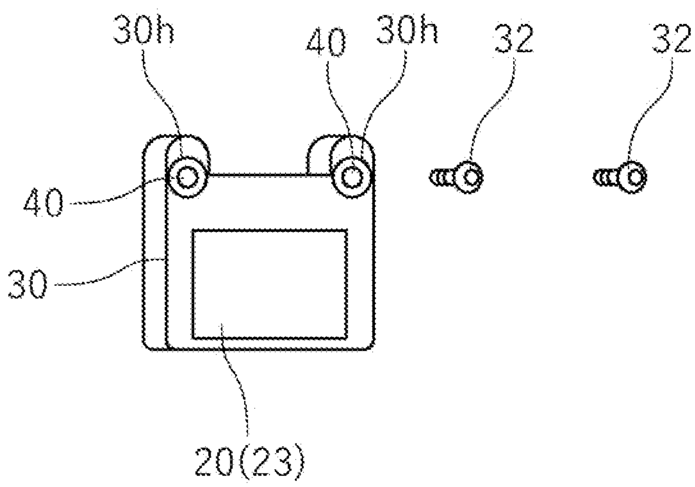
FIG. 4 is a perspective view showing a radar and a case.

As shown in FIG. 4, the casing 23 of the radar 20 is fixed to a case 30 made of a resin. Holes 30*h* that are open in the front-rear direction are formed in an upper left portion and an upper right portion of the case 30. Bolts 32 are inserted in the holes 30*h* of the case 30 and the holes 13*h* of the base member 13. The bolts 32 are fastened in the holes 30*h* and the holes 13*h* while the upper left portion and the upper right portion of the case 30 are pressed against the fold-back portions 13*b* of the base member 13 with a rubber mount 40 therebetween, thereby fixing the case 30 to the base member 13. Thus, the radar 20 is indirectly supported on the seat frame 10 with the case 30, the rubber mount 40 and the base member 13 therebetween. Note that the rubber mount 40 is an example of a rubber member interposed between the seat frame 10 and the radar 20.

Figure 5:
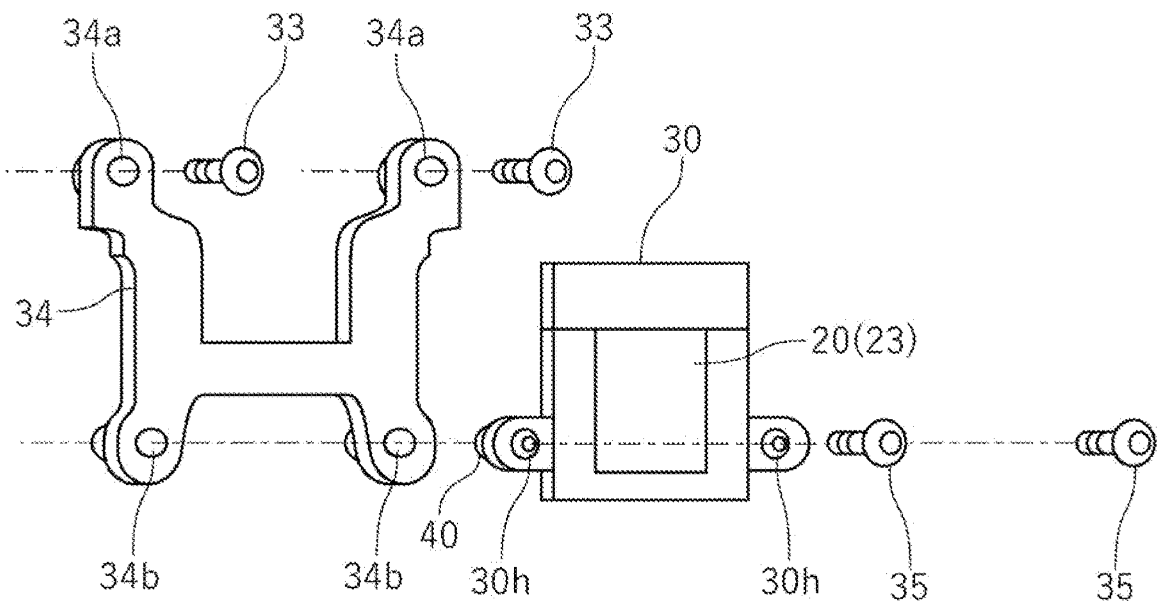
FIG. 5 is an exploded perspective view showing a portion of another example of a radar support structure.

In another example of the radar support structure, as shown in FIG. 5, a bracket 34 is interposed between the base member 13 and the case 30 made of a resin. Here, the bracket 34 is made of a metal. Holes 34*a* that are open in the front-rear direction are formed in an upper left portion and an upper right portion of the bracket 34. Holes 34*b* that are open in the front-rear direction are formed in a lower left portion and a lower right portion of the bracket 34. Holes 30*h* that are open in the front-rear direction are formed in a lower left portion and a lower right portion of the case 30.

Bolts 33 are inserted in the holes 34*a* in the upper left portion and the upper right portion of the bracket 34 and the holes 13*h* of the base member 13 (see FIG. 3). Bolts 35 are inserted in the holes 34*b* in the lower left portion and the lower right portion of the bracket 34 and the holes 30*h* of the case 30. The bolts 35 are fastened in the holes 30*h* and the holes 34*b* while the case 30 is pressed against the bracket 34 with the rubber mount 40 therebetween, thereby fixing the case 30 to the bracket 34. The bolts 33 are fastened in the holes 34*a* and the holes 13*h* while the bracket 34 is pressed against the fold-back portion 13*b* of the base member 13 (see FIG. 3), thereby fixing the bracket 34 to the base member 13. Thus, the radar 20 is indirectly supported on the seat frame 10 with the case 30, the rubber mount 40, the bracket 34 and the base member 13 therebetween. Note that the bracket 34 is an example of the support member that supports the radar 20.

Figure 6:
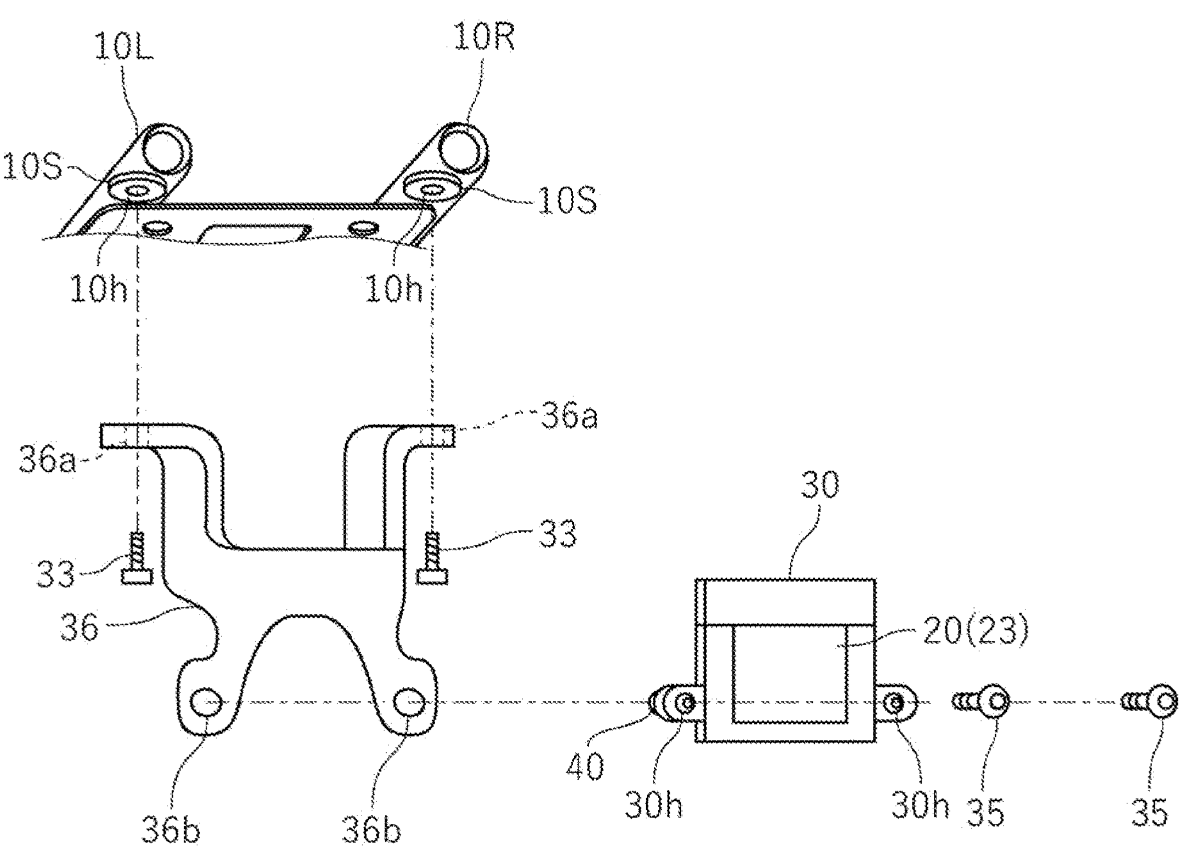
FIG. 6 is an exploded perspective view showing another example of a radar support structure.

In another example of the radar support structure, as shown in FIG. 6, a bracket 36 is interposed between the seat frame 10 and the case 30 made of a resin. Here, the bracket 36 is made of a metal. In this example, bosses 10S are welded to a lower portion of the left seat frame 10L and the right seat frame 10R. Holes 10*h* that are open downward are formed in the bosses 10S. Holes 36*a* that are open in the up-down direction are formed in an upper left portion and an upper right portion of the bracket 36. Holes 36*b* that are open in the front-rear direction are formed in a lower left portion and a lower right portion of the bracket 36.

The bolts 33 are inserted in the holes 36*a* in the upper left portion and the upper right portion of the bracket 36 and the holes 10*h* of the bosses 10S. The bolts 35 are inserted in the holes 36*b* of the lower left portion and the lower right portion of the bracket 36 and the holes 30*h* of the case 30. The bolts 35 are fastened in the holes 30*h* and the holes 36*b* while the case 30 is pressed against the bracket 36 with the rubber mount 40 therebetween, thereby fixing the case 30 to the bracket 36. The bolts 33 are fastened in the holes 36*a* and the holes 10*h* while the bracket 36 is pressed against the bosses 10S of the seat frame 10, thereby fixing the bracket 36 to the seat frame 10. Thus, the radar 20 is indirectly supported on the seat frame 10 with the case 30, the rubber mount 40, the bracket 36 and the boss 10S therebetween. The bracket 36 is an example of the support member that supports the radar 20.

As shown in FIG. 2, at least a portion of the radar 20 is arranged forward relative to the rear end 14*b* of the tail light 14, downward relative to an upper end 10*t* of the seat frame 10, rearward relative to the front end 12*f* of the rear fender 12, and upward relative to a lower end 12*d* of the rear fender 12. Here, the entirety of the radar 20 is arranged forward relative to the rear end 14*b* of the tail light 14, downward relative to the upper end 10*t* of the seat frame 10, rearward relative to the front end 12*f* of the rear fender 12, and upward relative to the lower end 12*d* of the rear fender 12. The radar 20 is arranged downward relative to a lower end 14*d* of the tail light 14.

As shown in FIG. 2, T20 denotes the triangle that connects together a front end 14*f* of the tail light 14, the upper end 12*t* of the rear fender 12 and the lower end 12*d* of the rear fender 12 as the vehicle is viewed from the side. Here, at least a portion of the radar 20 is located inside the triangle T20.

A front end 20*f* of the radar 20 is located forward relative to the rear end 10*b* of the seat frame 10. A rear end 20*b* of the radar 20 is located rearward relative to the rear end 10*b* of the seat frame 10. The front end 20*f* of the radar 20 is located forward relative to the front end 14*f* of the tail light 14. The rear end 20*b* of the radar 20 is located rearward relative to the front end 14*f* of the tail light 14. The rear end 20*b* of the radar 20 is located forward relative to the rear end 14*b* of the tail light 14.

The license plate 15 is supported on the rear fender 12. The license plate 15 is arranged downward of the tail light 14. The radar 20 is arranged upward relative to the license plate 15. At least a portion of the radar 20 is arranged forward relative to the license plate 15. Here, the entirety of the radar 20 is arranged forward relative to the license plate 15.

As shown in FIG. 2, a luggage box 16 as an optional accessory can be attached rearward of the seat 9. The luggage box 16 is arranged upward of the tail light 14. The radar 20 is arranged downward of the luggage box 16. The radar 20 is arranged forward of the luggage box 16. The motorcycle 1 according to the first embodiment is configured as described above.

As described above, with the motorcycle 1 according to the present embodiment, at least a portion of the radar 20 is arranged forward relative to the rear end 14*b* of the tail light 14, downward relative to the upper end 10*t* of the seat frame 10, rearward relative to the front end 12*f* of the rear fender 12 and upward relative to the lower end 12*d* of the rear fender 12. Thus, even a relatively large radar 20 can be arranged in a rear portion of the vehicle body without difficulty. The radar 20 is less likely to block emitted light from the tail light 14. With the motorcycle 1, it is possible to ensure the visibility of the tail light 14 while having a relatively large radar 20. The radar 20 does not block the tail light 14 from illuminating the license plate 15. Therefore, it is possible to ensure the visibility of the license plate 15.

With the motorcycle 1, the radar 20 is supported on the seat frame 10. As compared with the rear fender 12 and the seat cowl 11, the seat frame 10 has a high rigidity and less likely to flex. Therefore, the radar 20 is less influenced by vibration as compared with a case where the radar 20 is supported on the rear fender 12 or the seat cowl 11.

Thus, according to the present embodiment, it is possible to obtain the motorcycle 1 in which the radar 20 does not block emitted light from the tail light 14 and is less likely to be influenced by vibration.

According to the present embodiment, mud, etc., which is rolled up from the road surface is blocked by the rear fender 12, and it is possible to sufficiently prevent mud, etc., from adhering to the radar 20.

As described above, there is no particular limitation on the structure for supporting the radar 20 on the seat frame 10. For example, the bracket 34 (see FIG. 5) may be fixed to the base member 13, and the radar 20 may be supported by the bracket 34. Then, it is possible to stably support the radar 20. Therefore, it is possible to effectively suppress vibration of the radar 20 while the motorcycle 1 is running.

The bracket 36 (see FIG. 6) may be fixed to the left seat frame 10L and the right seat frame 10R, and the radar 20 may be supported by the bracket 36. Then, it is possible to stably support the radar 20. Therefore, it is possible to effectively suppress vibration of the radar 20 while the motorcycle 1 is running.

As shown in FIG. 2, the support member 18 that supports the radar 20 may extend rearward and downward from the seat frame 10. Then, the support member 18 and the radar 20 can be arranged in a compact arrangement.

As is the rubber mount 40 described above, a rubber-made member may be interposed between the seat frame 10 and the radar 20. Then, vibration of the seat frame 10 is less likely to be transmitted to the radar 20. Therefore, it is possible to suppress vibration of the radar 20. Note that the rubber-made member is not limited to a cylindrical rubber mount 40.

While there is no particular limitation on the shape of the tail light 14, the tail light 14 is formed as a thin-type tail light in the present embodiment as shown in FIG. 2. The dimension LB14 of the tail light 14 in the second direction LB is smaller than the dimension LA14 thereof in the first direction LA. Since the tail light 14 is of a thin type as described above, the radar 20 is less likely to block emitted light from the tail light 14. The tail light 14 and the radar 20 are arranged in a compact arrangement.

Second Embodiment

Figure 7:
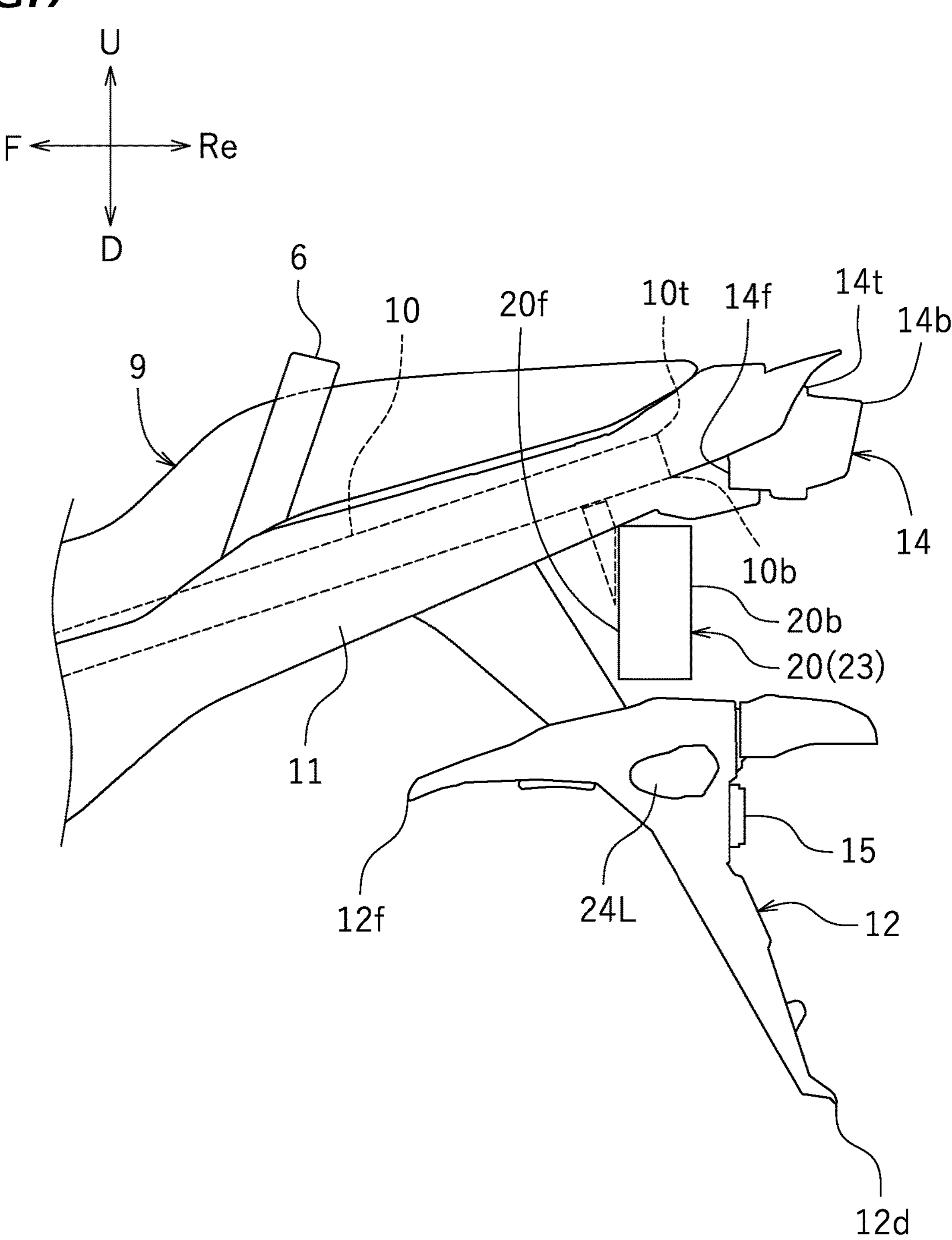
FIG. 7 is a side view showing a rear portion of a motorcycle according to a second embodiment.
Figure 8:
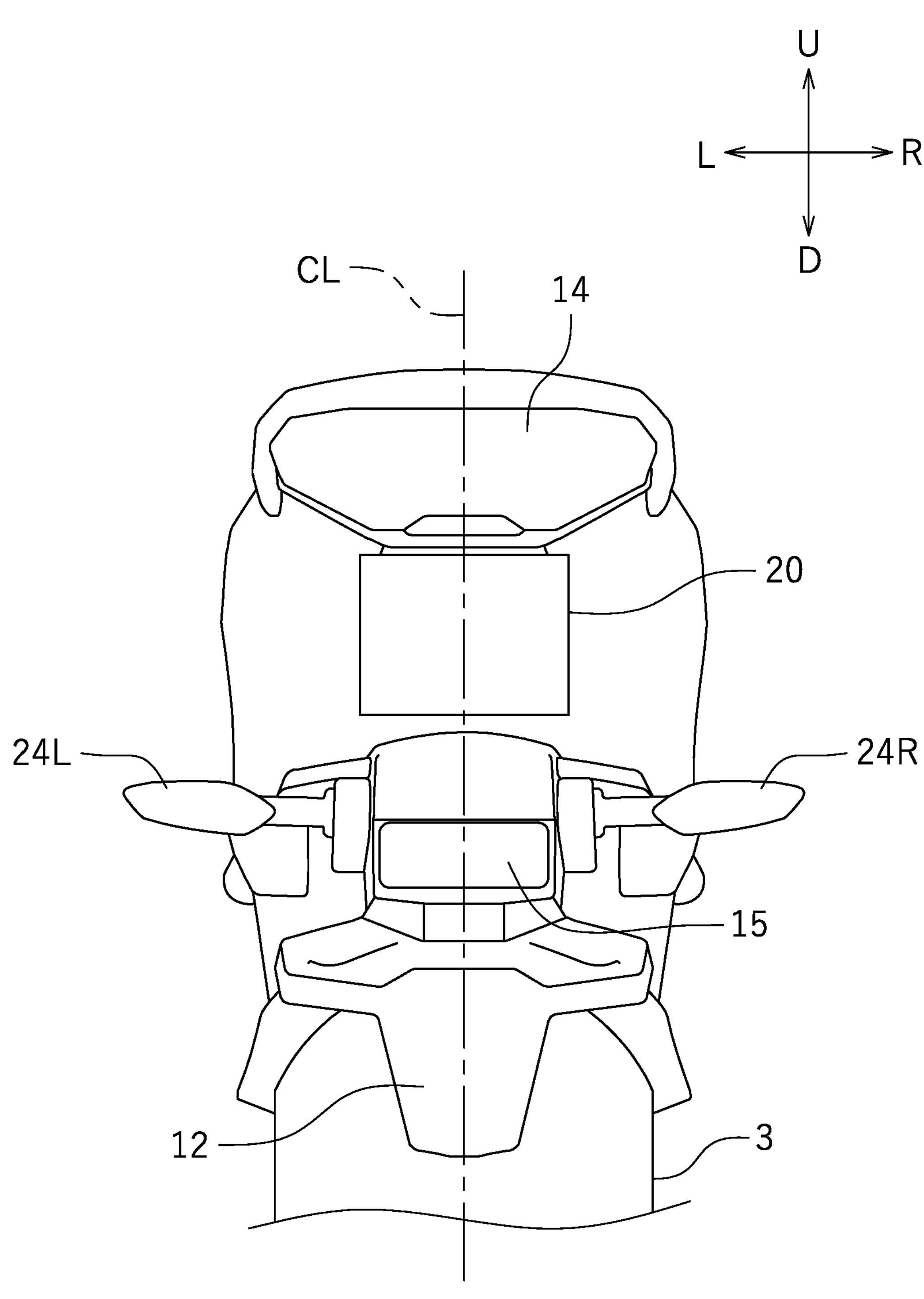
FIG. 8 is a back view showing a rear portion of the motorcycle according to the second embodiment.

FIG. 7 is an enlarged side view showing a rear portion of the motorcycle 1 according to the second embodiment. FIG. 8 is a back view showing a rear portion of the motorcycle 1 according to the second embodiment. In the description below, like members to those of the first embodiment are denoted by like reference signs.

As shown in FIG. 7 and FIG. 8, as in the first embodiment, the motorcycle 1 includes the seat frame 10, the seat cowl 11, the tail light 14, the rear fender 12, the license plate 15 and the radar 20. Note that FIG. 7 does not show the rear wheel 3. Reference sign 6 denotes a grab bar.

As shown in FIG. 7, also in the present embodiment, at least a portion of the radar 20 is arranged forward relative to the rear end 14*b* of the tail light 14, downward relative to the upper end 10*t* of the seat frame 10, rearward relative to the front end 12*f* of the rear fender 12 and upward relative to the lower end 12*d* of the rear fender 12. Here, the entirety of the radar 20 is arranged forward relative to the rear end 14*b* of the tail light 14, downward relative to the upper end 10*t* of the seat frame 10, rearward relative to the front end 12*f* of the rear fender 12 and upward relative to the lower end 12*d* of the rear fender 12.

As in the first embodiment, the radar 20 is supported on the seat frame 10. As the structure for supporting the radar 20 on the seat frame 10, various structures described above may preferably be used, for example. The dimension of the casing 23 of the radar 20 in the front-rear direction is smaller than the dimension thereof in the up-down direction and the left-right direction.

In the present embodiment, left and right flashers 24L and 24R are attached to the rear fender 12. The radar 20 is arranged upward relative to the flashers 24L and 24R.

The front end 20*f* of the radar 20 is located forward relative to the rear end 10*b* of the seat frame 10. The rear end 20*b* of the radar 20 is located rearward relative to the rear end 10*b* of the seat frame 10. The front end 20*f* of the radar 20 is located forward relative to the front end 14*f* of the tail light 14. The rear end 20*b* of the radar 20 is located forward relative to the front end 14*f* of the tail light 14. The rear end 20*b* of the radar 20 is located forward relative to the rear end 14*b* of the tail light 14.

As in the first embodiment, the seat frame 10 is made of a metal, and the seat cowl 11 and the rear fender 12 are made of a synthetic resin. However, there is no particular limitation on these materials.

Also in the present embodiment, it is possible to obtain the motorcycle 1 in which the radar 20 does not block emitted light from the tail light 14 and is less likely to be influenced by vibration.

Third Embodiment

Figure 9:
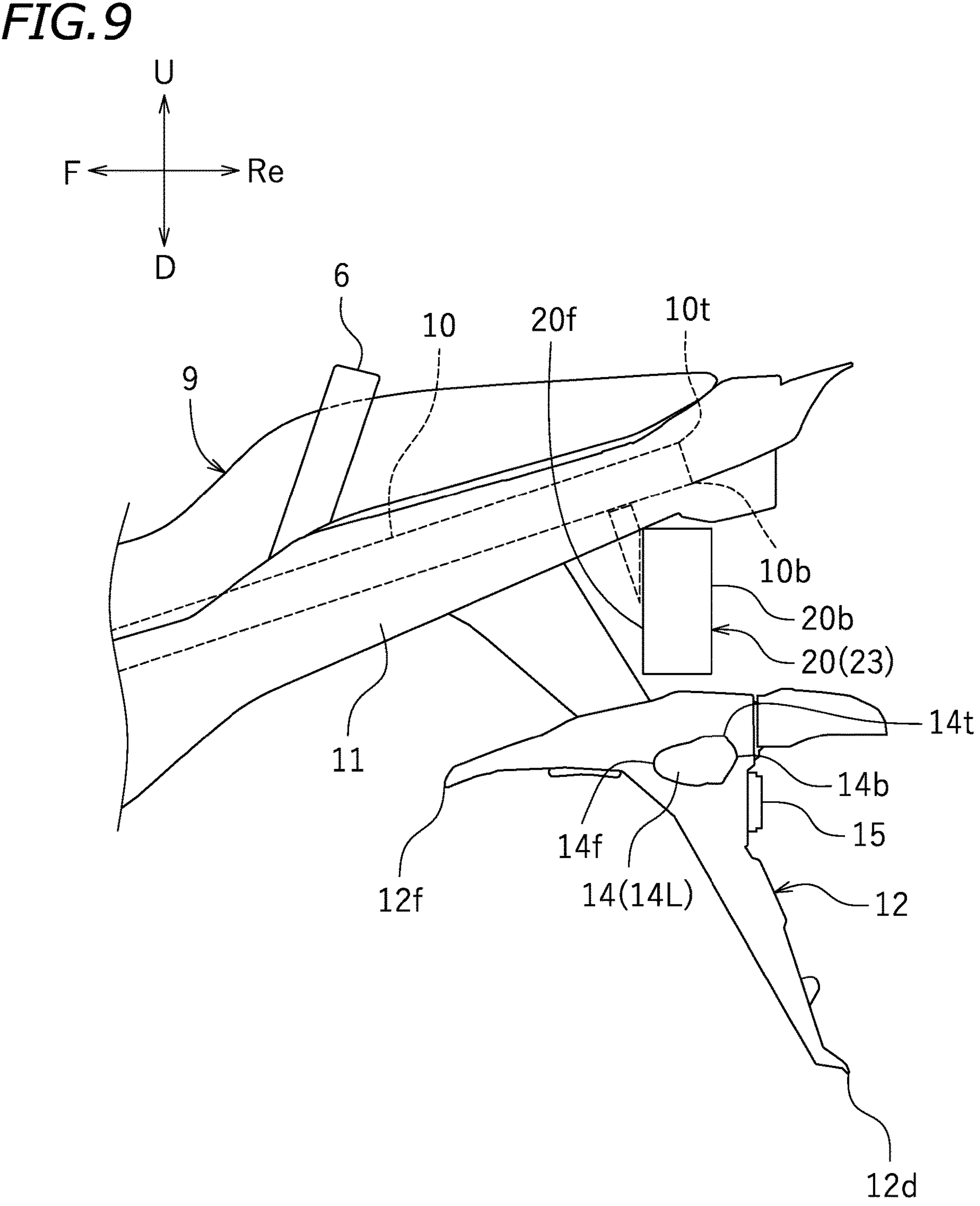
FIG. 9 is a side view showing a rear portion of a motorcycle according to a third embodiment.
Figure 10:
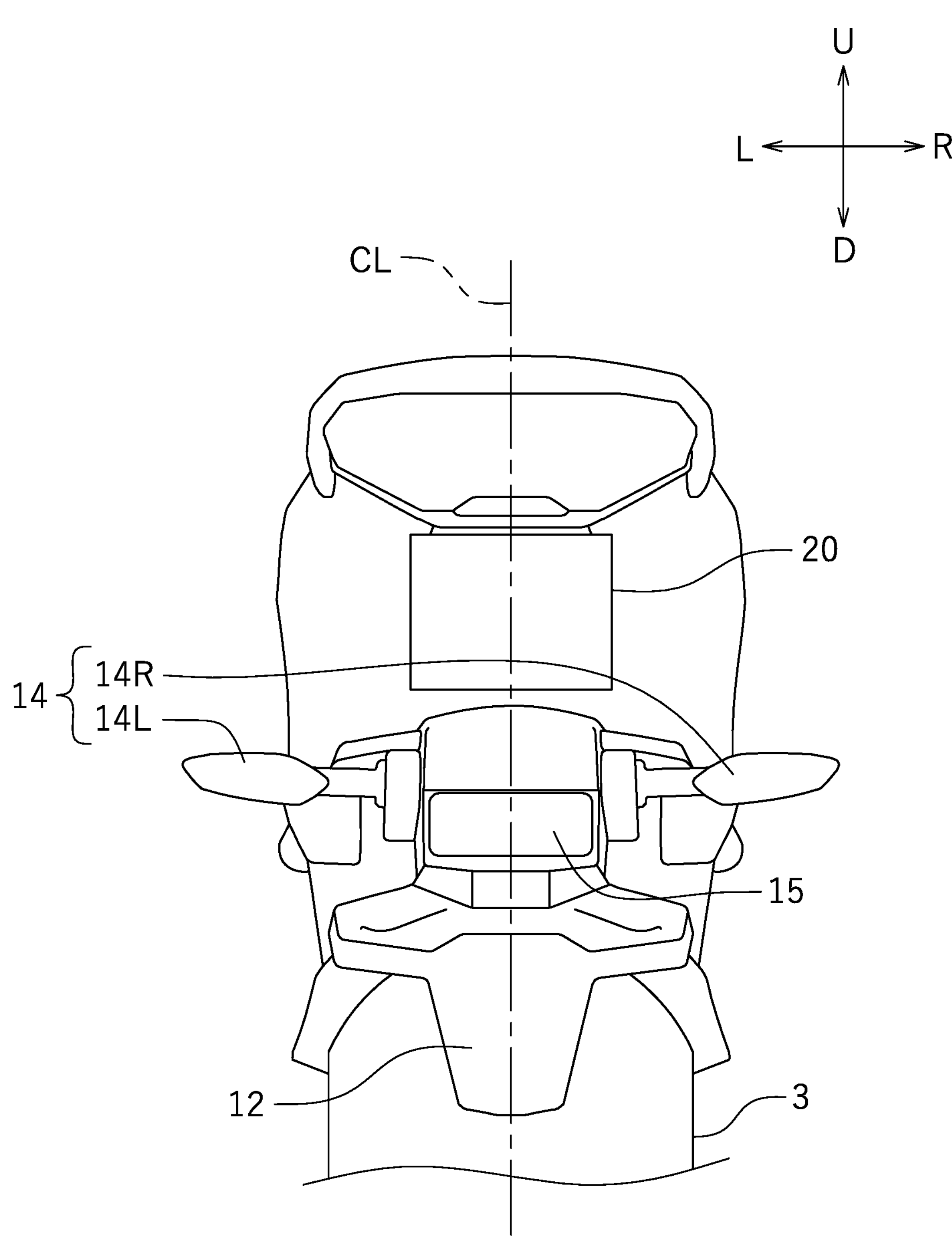
FIG. 10 is a back view showing a rear portion of the motorcycle according to the third embodiment.

FIG. 9 is an enlarged side view showing a rear portion of the motorcycle 1 according to the third embodiment. FIG. 10 is a back view showing a rear portion of the motorcycle 1 according to the third embodiment. In the description below, like members to those of the first embodiment and the second embodiment are denoted by like reference signs.

Also in the present embodiment, the motorcycle 1 includes the seat frame 10, the seat cowl 11, the rear fender 12, the license plate 15 and the radar 20. FIG. 9 does not show the rear wheel 3.

In the present embodiment, the tail light 14 functions also as a flasher. As shown in FIG. 10, the tail light 14 includes a left tail light 14L and a right tail light 14R. The left tail light 14L and the right tail light 14R are arranged in left-right symmetry with respect to the vehicle center line CL. The position of the left tail light 14L in the front-rear direction and the up-down direction is the same as that of the right tail light 14R.

As shown in FIG. 9, also in the present embodiment, at least a portion of the radar 20 is arranged forward relative to the rear end 14*b* of the tail light 14, downward relative to the upper end 10*t* of the seat frame 10, rearward relative to the front end 12*f* of the rear fender 12 and upward relative to the lower end 12*d* of the rear fender 12. Here, the entirety of the radar 20 is arranged forward relative to the rear end 14*b* of the tail light 14, downward relative to the upper end 10*t* of the seat frame 10, rearward relative to the front end 12*f* of the rear fender 12 and upward relative to the lower end 12*d* of the rear fender 12.

As in the first embodiment and the second embodiment, the radar 20 is supported on the seat frame 10. As the structure for supporting the radar 20 on the seat frame 10, various structures described above may preferably be used, for example. The dimension of the casing 23 of the radar 20 in the front-rear direction is smaller than the dimension thereof in the up-down direction and the left-right direction.

In the present embodiment, the tail light 14 is attached to the rear fender 12. The radar 20 is arranged upward relative to an upper end 14*t* of the tail light 14.

The front end 20*f* of the radar 20 is located forward relative to the rear end 10*b* of the seat frame 10. The rear end 20*b* of the radar 20 is located rearward relative to the rear end 10*b* of the seat frame 10. The front end 20*f* of the radar 20 is located forward relative to the front end 14*f* of the tail light 14. The rear end 20*b* of the radar 20 is located rearward relative to the front end 14*f* of the tail light 14. The rear end 20*b* of the radar 20 is located forward relative to the rear end 14*b* of the tail light 14.

As in the first embodiment and the second embodiment, the seat frame 10 is made of a metal, and the seat cowl 11 and the rear fender 12 are made of a synthetic resin. However, there is no particular limitation on these materials.

Also in the present embodiment, it is possible to obtain the motorcycle 1 in which the radar 20 does not block emitted light from the tail light 14 and is less likely to be influenced by vibration.

Some embodiments have been described above. Note however that these embodiments are merely examples. Various other embodiments are possible.

A straddled vehicle refers to a vehicle that is straddled by a passenger. A straddled vehicle is not limited to the motorcycle 1. A straddled vehicle may be an auto tricycle, an ATV (All Terrain Vehicle) or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

REFERENCE SIGNS LIST

1: Motorcycle (straddled vehicle), 9: Seat, 10: Seat frame, 10L: Left seat frame, 10R: Right seat frame, 11: Seat cowl, 12: Rear fender, 13: Base member, 14: Tail light, 18: Support member, 20: Radar, 21: Transmitter, 22: Receiver, 23: Casing, 34: Bracket (support member), 36: Bracket (support member), 40: Rubber mount (rubber-made member), LA: First direction, LB: Second direction

What is claimed is:

1. A straddled vehicle comprising:
a seat frame extending rearward and upward, the seat frame including:
a left seat frame, and
a right seat frame arranged rightward of the left seat frame in a left-right direction of the straddled vehicle;
a base member fixed to the left seat frame and the right seat frame;
a seat supported by the seat frame;
a rear fender extending rearward and downward, the rear fender having a front end located further forward than a rear end of the seat frame;
a tail light having a rear end thereof located further rearward than a rear end of the seat;
a radar including
a transmitter that transmits radio waves,
a receiver that receives the radio waves, and
a casing that houses the transmitter and the receiver; and
a support member that connects the radar to the seat frame, so that the radar is rigidly supported by the seat frame, the support member being fixed either to the left seat frame and the right seat frame, or to the base member, wherein
at least a portion of the radar is arranged
further forward than the rear end of the tail light,
further downward than an upper end of the seat frame,
further rearward than the front end of the rear fender, and
further upward than a lower end of the rear fender.

2. The straddled vehicle according to claim 1, further comprising:
a seat cowl arranged on a side of the seat frame, wherein the radar is supported by neither the rear fender nor the seat cowl.

3. The straddled vehicle according to claim 1, wherein the support member extends rearward and downward.

4. The straddled vehicle according to claim 1, further comprising a member that is made of rubber and is interposed between the seat frame and the radar.

5. The straddled vehicle according to claim 1, wherein:

the tail light is arranged further upward than an upper end of the rear fender; and the radar is arranged further downward than a lower end of the tail light.

6. The straddled vehicle according to claim 5, wherein in a side view of the straddled vehicle, a dimension of the tail light in a first direction is larger than a dimension of the tail light in a second direction, wherein the first direction is a direction of extension of the rear end of the seat frame, and the second direction is perpendicular to the first direction.

7. The straddled vehicle according to claim 1, wherein:

the tail light is attached to the rear fender; and the radar is arranged further upward than an upper end of the tail light.

8. The straddled vehicle according to claim 1, wherein a front end of the radar is located further forward than the rear end of the seat frame.

9. The straddled vehicle according to claim 1, wherein a rear end of the radar is located further rearward than the rear end of the seat frame.

10. The straddled vehicle according to claim 1, wherein a front end of the radar is located further forward than a front end of the tail light.

11. The straddled vehicle according to claim 1, wherein a rear end of the radar is located further forward than the rear end of the tail light.

12. The straddled vehicle according to claim 1, wherein a dimension of the casing in a front-rear direction is smaller than a dimension of the casing in an up-down direction.

13. The straddled vehicle according to claim 1, wherein the support member directly connects the radar to a lower side of the seat frame.

14. The straddled vehicle according to claim 1, wherein the radar is located on an external side of the rear fender.

* * * * *